United States Patent
Schmidt et al.

(10) Patent No.: US 7,448,220 B2
(45) Date of Patent: Nov. 11, 2008

(54) TORQUE CONTROL FOR STARTING SYSTEM

(75) Inventors: Dennis E. Schmidt, San Diego, CA (US); David L. Ripley, San Diego, CA (US); Lawrence A. Cogsdill, Coronado, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 603 days.

(21) Appl. No.: 11/253,971

(22) Filed: Oct. 19, 2005

(65) Prior Publication Data

US 2007/0084214 A1    Apr. 19, 2007

(51) Int. Cl.
*F02C 7/275* (2006.01)

(52) U.S. Cl. .......................................... 60/788; 60/786
(58) Field of Classification Search ................ 60/39.08, 60/786, 787, 788
See application file for complete search history.

(56) References Cited

U.S. PATENT DOCUMENTS

| | | | | |
|---|---|---|---|---|
| 6,035,626 | A * | 3/2000 | Wahl et al. | 60/773 |
| 7,204,090 | B2 * | 4/2007 | O'Connor | 60/778 |

* cited by examiner

*Primary Examiner*—Louis J Casaregola
(74) *Attorney, Agent, or Firm*—Stephen G. Mican

(57) ABSTRACT

A start system for a gas turbine engine delivers starter current according to a schedule selected according to measured rotational speed and oil temperature of the gas turbine engine.

35 Claims, 2 Drawing Sheets

TORQUE CONTROL FOR STARTING SYSTEM

FIELD OF THE INVENTION

The invention relates to a starting system for a gas turbine engine, and more particularly to such a starting system that has a torque control responsive to environmental conditions.

BACKGROUND OF THE INVENTION

Modern aircraft secondary power systems have a gas turbine powered auxiliary power unit (APU) on board to provide electrical, hydraulic and pneumatic power for operating systems aboard the aircraft when the propulsion engines are shut down as well as to provide power for starting the propulsion engines. Typically, pneumatic power, provided by a load compressor within the APU, is used to start the propulsion engines.

An electrical start system that comprises a starter or starter generator initiates ignition of the APU. The start system must generate enough torque to overcome drag or resisting torque of the APU and to accelerate the APU to achieve light off and self-sustaining rotational speed. The drag torque of an APU increases as the temperature of the APU decreases. This is due to several factors, one of which is increased drag due to residual oil left in the APU.

Typically, an APU uses a start system with a DC brushed starter motor that must be sized to provide enough torque to start the APU during the most severe environmental conditions when APU drag torque levels peak. Such a start system must then draw a substantial amount of current under all environmental conditions even though such current levels are only needed to overcome peak drag torque levels encountered under severe environmental conditions.

Because the start system generates so much torque, it may cause the APU to accelerate too quickly under average conditions, possibly causing the APU to pass through its light-off window before it has a chance to start, thereby causing a failed start. It also results in high inrush currents that may require aircraft storage batteries and electrical cables that supply the start system in order to avoid large electrical potential drops.

One prior art approach has been to control acceleration of a start system to a set of pre-determined acceleration values for the starting, light-off and post-ignition phases of APU operation. Adjustment of starting system torque is based upon comparison of the actual acceleration values to the pre-determined acceleration values. See U.S. Pat. No. 5,428,275 to Carr et al. Another prior art approach has been to control torque of a start system to follow a predetermined acceleration schedule that is selected based upon the speed, oil temperature and inlet temperature of the APU. See U.S. Pat. No. 6,035,626 to Wahl et al. Although these approaches can be effective, a simpler approach to controlling start system torque is desirable.

SUMMARY OF THE INVENTION

The invention comprises a start system for a gas turbine engine that delivers starter current according to a schedule selected according to measured engine rotational speed and engine oil temperature. The selected schedule provides enough current so that the start system provides sufficient torque to the engine to overcome drag torque regardless of oil temperature and accelerate the engine at a reasonable rate whilst limiting acceleration to minimise current draw and prevent failed starts.

One possible embodiment of the invention comprises a start system for a gas turbine engine to deliver starter current according to a schedule selected according to measured rotational speed and oil temperature of the gas turbine engine, comprising: a baseline starting current signal level source that produces a baseline starting current level signal that represents a baseline starting current needed to start the engine; an engine oil temperature sensor that produces an oil temperature signal representing oil temperature for the gas turbine engine; an engine rotational speed sensor that produces an engine rotational speed signal representing rotational speed of the engine; an offset current selector that produces an offset current signal level that represents an offset current needed to add to the baseline starting current to start the gas turbine engine based upon the engine oil temperature signal and the engine rotational speed signal; and a summer that combines the relay output with the baseline current starting signal to produce a compensated current starting command signal that shifts in current level according to engine oil temperature and engine rotational speed conditions.

DETAILED DESCRIPTION OF THE INVENTION

Figure 1:
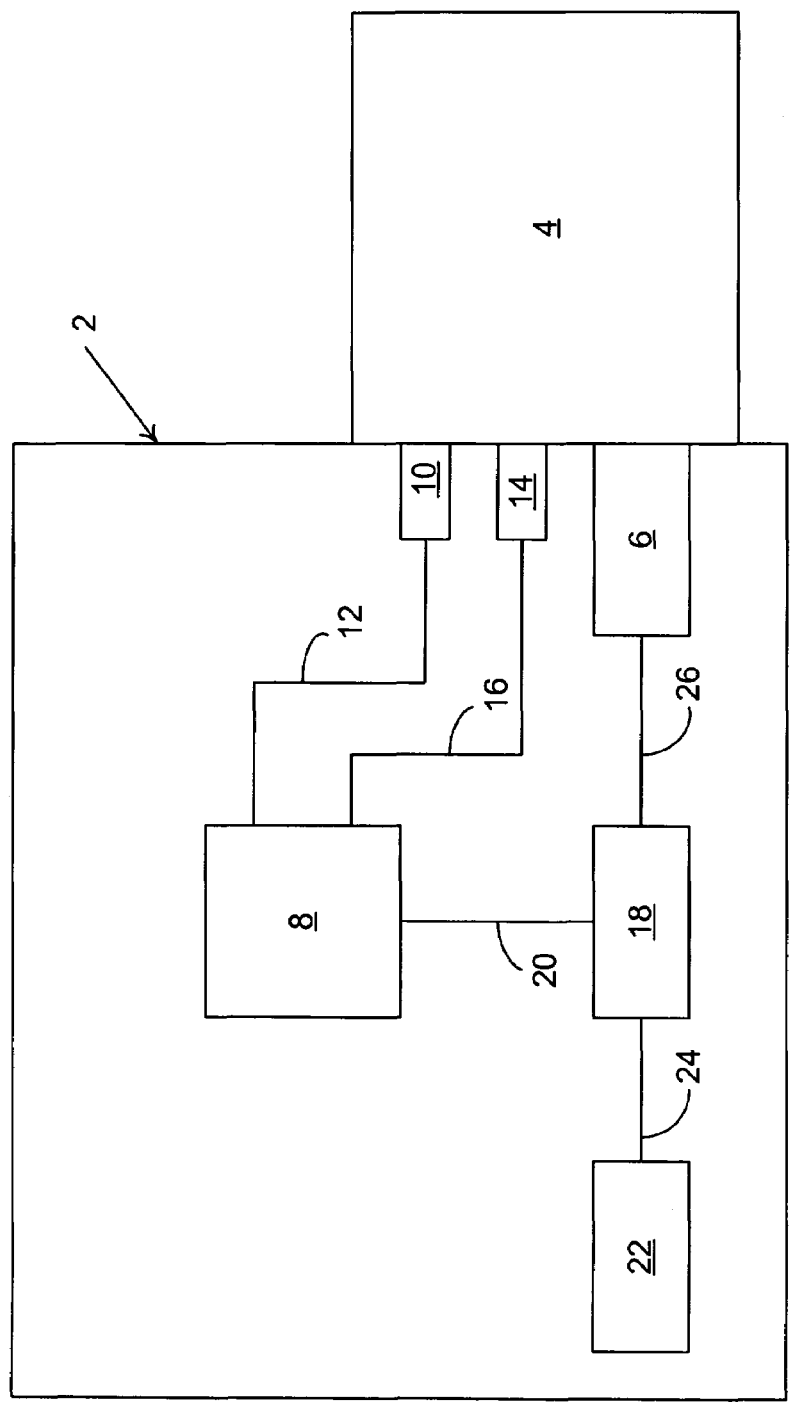
FIG. 1 is a block diagram of a preferred implementation of the invention.

Referring to FIG. 1, the invention comprises a start system 2 for a gas turbine engine 4, such as an APU, that has a starter 6 with torque output responsive to current input, such as a brushless DC motor. The starter 6 may actually serve as a starter generator or dedicated starter motor. An electronic controller 8, such as a full authority digital electronic controller (FADEC), may monitor temperature of the oil in the gas turbine engine 4, such as with an oil temperature signal provided by an engine oil temperature sensor 10 connected to it by way of an engine oil temperature data line 12, and rotational speed of the gas turbine engine 4, such as with a rotational speed signal provided by a rotational speed sensor 14 connected to it by way of a rotational speed data line 16. Of course, the electronic controller 8 may derive engine oil temperature and engine rotational speed by other means if convenient.

The electronic controller 8 may provide a schedule of current levels to be delivered to the starter 6 based upon the monitored oil temperature and rotational speed of the gas turbine engine 4 by way of suitable control signals transmitted by the electronic controller 8 to a starter power controller 18 by way of a electronic controller data line 20. The power controller 18 receives electrical power supplied from a power source 22, such as an aircraft battery, connected to it by way of a power source cable 24. The power controller 18 regulates electrical power that it supplies to the gas turbine engine 4 by way of a power controller line 26 with current level determined by the control signals transmitted to it by the electronic controller 8.

For example, when the engine oil is cold and the gas turbine engine 4 is at rest, the electronic controller 8 may request a higher current level from the start system 2 by transmitting to the power controller 18 a higher current level schedule that extends from engine start initiation to some predetermined rotational speed in order that the start system 2 can provide enough torque to cause the engine to break free of its rest position and rotate. As the electronic controller 8 senses the rotational speed of the gas turbine engine 4 increasing, it may select and transmit to the power controller 18 a lower current level schedule to manage current drawn from the power source 22 as well as to maintain a reasonable acceleration of the gas turbine engine 4 through its light-off window to prevent a failed start. In this way, the start system 2 reduces to a minimum the energy drawn from the power source 22 and assures more reliable engine light-offs under all environmental conditions.

Figure 2:
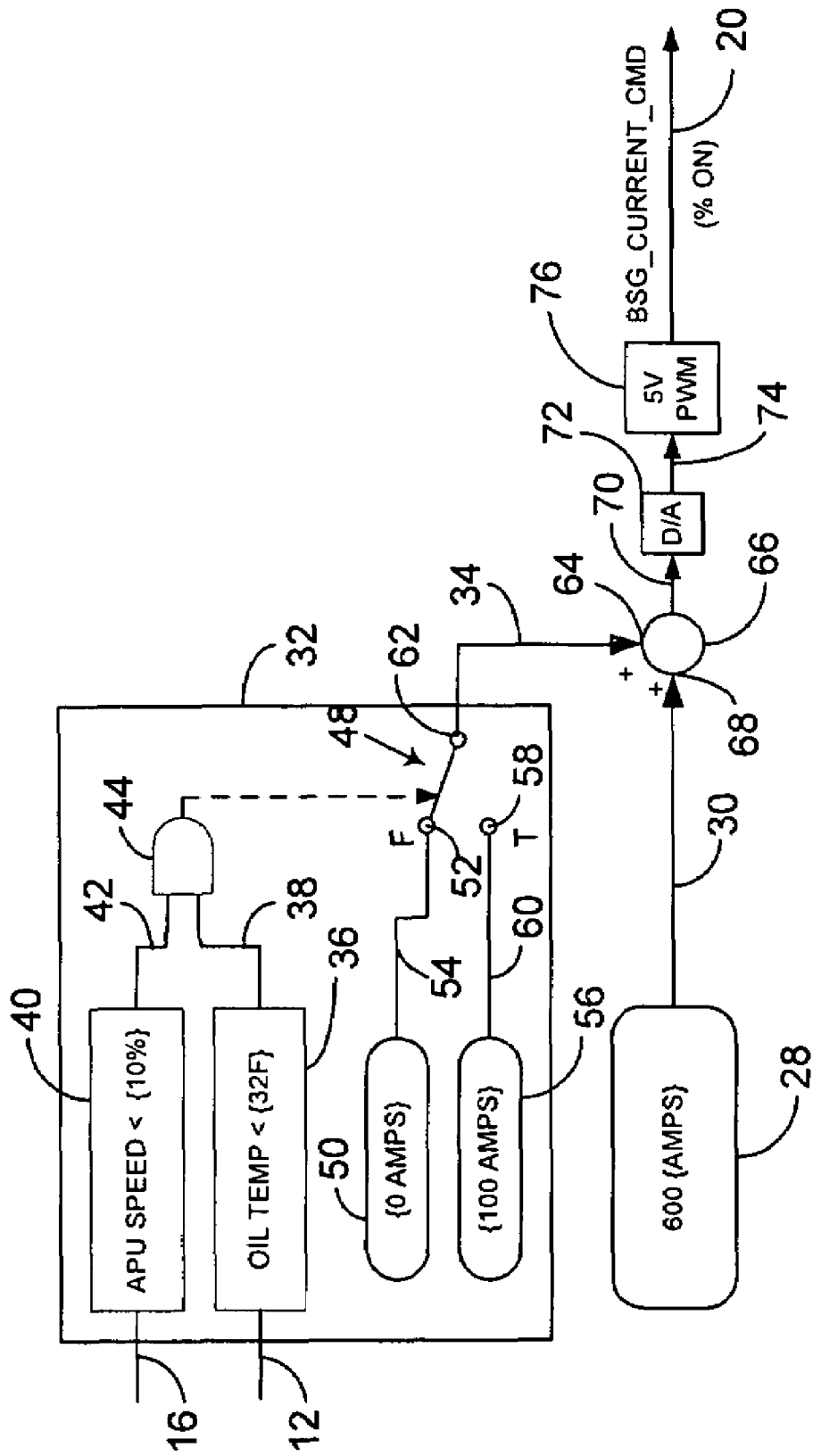
FIG. 2 is a schematic diagram of a preferred implementation of control circuitry for the invention.

FIG. 2 is a schematic diagram of a preferred implementation of control circuitry for the invention that may be located in the electronic controller 8. The electronic controller 8 has a baseline current signal level controller 28 that provides a baseline starting current level signal for the starter 6 on a baseline current signal line 30. During cold ambient conditions, the starter 6 may need more current to overcome gas turbine engine starting factors such as static friction, cold engine oil, ice build-up or a combination thereof. The temperature offset current value represents the extra current over the baseline supply current that may be required to overcome such gas turbine engine starting factors. The starter system 2 compensates for the extra current needed for these gas turbine engine starting factors adding an appropriate offset current to the baseline supply current when the gas turbine engine temperature signal on the oil temperature data line 12 and the gas turbine engine rotational speed signal on the gas turbine engine rotational speed data line 16 are within certain ranges. In one possible embodiment of the invention, the start system 2 compensates the baseline supply current with the offset current as follows.

The gas turbine engine oil temperature signal on the oil temperature data line 12 couples to an input of an offset current selector 32. The engine rotational speed signal on the engine rotational speed data line 16 couples to another input of the offset current selector 32. The offset current selector 32 produces an offset current signal on an offset current selector line 34 that varies between a non-compensating level, typically representing zero, and a compensating level, typically representing a level of current needed to add to the baseline starting current to start the gas turbine engine 4 under adverse starting conditions. Generally, a reasonable range of offset current is roughly 0 to 25 percent of the baseline starting current. The upper limit of this range is generally limited by the size of the power controller 18 for the start system 2. For instance, if the baseline starting current is approximately 600 amperes, the compensating level of the offset current may be in the range of approximately 0 to 150 amperes. A predetermined offset current of approximately 100 amperes is believed to be satisfactory.

FIG. 2 shows one possible embodiment of the offset current selector 32. The input of the offset current selector 32 that couples to the engine oil temperature signal on the oil temperature data line 12 couples to an input of a low oil temperature detector 36. The low oil temperature detector 36 produces a low oil temperature signal on a low oil temperature detector line 38 with a level that represents a logic "1" if the oil temperature is less than a predetermined offset enable temperature, and a logic "0" if the oil temperature is not less than the predetermined offset temperature. Generally, torque required to start the gas turbine engine 4 increases significantly between 0 and −20 degrees C., so a reasonable value of offset enable temperature shall be approximately approximately 0 to −20 degrees C. A predetermined offset enable temperature of approximately 0 degrees is believed to be satisfactory.

The input of the offset current selector 32 that couples to the engine rotational speed signal on the engine rotational speed data line 16 couples to an input of a low engine speed detector 40. The low engine speed detector 40 produces a low engine speed detector signal on an low engine speed detector line 42 with a level that represents a logic "1" if the engine rotational speed is less than a predetermined offset enable rotational speed and a logic "0" if the gas turbine engine rotational speed is not less than the predetermined offset enable rotational speed. Generally, the predetermined offset enable rotational speed roughly corresponds to an expected light-off window for the gas turbine engine 4, and this can range from approximately 5 to 20 percent of maximum rotational speed for certain gas turbine engines 4. A predetermined offset enable rotational speed of approximately 10 percent of is believed to be satisfactory in practice for such gas turbine engines 4.

The output of the low oil temperature detector 36 on the low oil temperature detector line 38 and the output of the low engine speed detector 40 on the low engine speed detector line 42 couple to the inputs of an "AND" gate 44. The AND gate 44 produces a gate output signal with a level that represents a logic "1" on an AND gate output line 46 only when both of its inputs are logic "1", that is, when both the oil temperature and the engine rotational speed are less than the predetermined offset enable values. Otherwise, the AND gate output signal has a level that represents a logic "0" on the AND gate output line 44.

The AND gate signal on the AND gate output line 46 controls an offset current relay 48 that responds to the logic "1" level, such as a single pole double throw (SPDT) relay. A non-compensating current offset level source 50 provides the non-compensating offset current level signal to a normally closed (NC) relay input 52 on the offset current relay 48 by way of a non-compensating offset current line 54. A compensated current offset level source 56 provides the compensated offset current level signal to a normally open (NO) relay input 58 by way of a compensated offset current line 60.

When the AND gate 44 logic output is "0", that is, when either the oil temperature or the gas turbine engine rotational speeds are not less than the predetermined offset values, the offset current relay remains deactivated and the offset current relay 48 connects the non-compensating offset current signal level on the NC relay input 52 to an offset relay current output 62 on the offset current selector line 34. When the AND gate 44 logic output is "1", that is, when both of its inputs are logic "1" because both the oil temperature and the gas turbine engine rotational speeds are less than the predetermined offset values, the offset current relay 44 becomes activated and the offset current relay 44 connects the compensated offset current signal level on the NO relay input 54 to the offset relay current output 62 on the offset current selector line 34.

The offset current signal on the offset current selector line 34 connects to a first input 64 of a summer 66. The baseline current signal line 30 connects to a second input 68 of the summer 66. The summer 66 then adds the non-compensating or compensated offset current signal levels to the baseline current signal level to produce an analogue starting current command signal on a summer output line 70. The analogue starting current command signal on the summer output line 70 connects to an input of an analogue-to-digital (A/D) converter 72. The A/D converter 72 converts the analogue starting current command signal to a digital starting current command signal on an A/D converter output line 74.

The digital starting current command signal on the A/D converter output line 74 connects to an input of a pulse width modulator (PWM) 76. The PWM 76 converts the digital starting current command signal on the A/D converter output line 74 to a PWM starting current control signal on the power controller line 20 that controls the power starter controller 18 as shown in FIG. 1.

Described above is a start system for a gas turbine engine that delivers starter current according to a schedule selected according to measured rotational speed and oil temperature of the gas turbine engine. It should be understood that this embodiment is only an illustrative implementation of the invention, that the various parts and arrangement thereof may be changed or substituted, and that the invention is only limited by the scope of the attached claims.

What is claimed is:

1. A start system for a gas turbine engine to deliver starting current according to a schedule selected according to measured rotational speed and oil temperature of the gas turbine engine, comprising:
    a baseline starting current signal level source that produces a baseline starting current level signal that represents a baseline starting current needed to start the engine;
    an engine oil temperature sensor that produces an oil temperature signal representing oil temperature for the gas turbine engine;
    an engine rotational speed sensor that produces an engine rotational speed signal representing rotational speed of the engine;
    an offset current selector that produces an offset current signal level that represents an offset current needed to add to the baseline starting current to start the gas turbine engine based upon the engine oil temperature signal and the engine rotational speed signal; and
    a summer that combines the offset current selector output with the baseline current starting signal to produce a compensated current starting command signal that shifts in current level according to engine oil temperature and engine rotational speed conditions.

2. The start system of claim 1, wherein the offset current signal level varies between a non-compensating level and a compensating level.

3. The start system of claim 2, wherein the offset current signal level reaches the compensating level when the oil temperature signal is less than a predetermined value and the engine rotational speed signal is less than a predetermined value.

4. The start system of claim 3, wherein the offset current selector further comprises a low oil temperature detector that produces a low oil temperature signal that has a level to represent engine oil temperature less than the predetermined value.

5. The start system of claim 4, wherein the offset current selector further comprises a low engine speed detector that produces a low engine speed detector signal that has a level to represent engine rotational speed less than the predetermined value.

6. The start system of claim 5, wherein the low oil temperature signal has a logic level "1" to represent engine oil temperature less than the predetermined value, the low engine speed detector signal that has a logic level "1" to represent engine rotational speed less than the predetermined value, and the offset current selector further comprises an AND gate with inputs coupled to the low oil temperature signal and the low engine speed detector signal to produce an AND gate output signal that has a logic "1" level when both the engine oil temperature and the engine rotational speeds are less than their respective predetermined values.

7. The start system of claim 6, wherein the offset current selector further comprises a relay that switches its output between a non-compensating current level and a compensating current level and the AND gate activates the relay with the AND gate output signal when it has a logic "1" level.

8. The start system of claim 3, wherein the predetermined value of oil temperature is within a range of approximately 0 to −20 degrees C.

9. The start system of claim 8, wherein the predetermined value of oil temperature is approximately 0 degrees C.

10. The start system of claim 3, wherein the predetermined value of engine rotational speed is within a range of approximately 5 to 20 percent of maximum engine rotational speed.

11. The start system of claim 10, wherein the predetermined value of engine rotational speed is approximately 10 percent of maximum engine rotational speed.

12. The start system of claim 1, further comprising an analogue-to-digital (A/D) converter that converts the compensated current starting command signal to a digital compensated current starting command signal.

13. The start system of claim 12, further comprising a pulse width modulator (PWM) that converts the digital compensated current starting command signal to a PWM starting current control signal that controls a power starter controller for the gas turbine engine.

14. A start system for a gas turbine engine to deliver starting current to a starter for the engine by way of a power starter controller according to a schedule selected according to measured rotational speed and oil temperature of the gas turbine engine, comprising:
    a baseline starting current signal level source that produces a baseline starting current level signal that represents a baseline starting current needed to start the engine;
    an engine oil temperature sensor that produces an oil temperature signal representing oil temperature for the gas turbine engine;
    an engine rotational speed sensor that produces an engine rotational speed signal representing rotational speed of the engine;
    an offset current selector that produces an offset current signal level that represents an offset current needed to add to the baseline starting current to start the gas turbine engine based upon the engine oil temperature signal and the engine rotational speed signal;
    a summer that combines the offset current selector output with the baseline current starting signal to produce a compensated current starting command signal that shifts in current level according to engine oil temperature and engine rotational speed conditions;
    an analogue-to-digital (A/D) converter that converts the compensated current starting command signal to a digital compensated current starting command signal; and
    a pulse width modulator (PWM) that converts the digital compensated current starting command signal to a PWM starting current control signal that controls the power starter controller for the gas turbine engine starter.

15. The start system of claim 14, wherein the offset current signal level varies between a non-compensating level and a compensating level.

16. The start system of claim 15, wherein the offset current signal level reaches the compensating level when the oil temperature signal is less than a predetermined value and the engine rotational speed signal is less than a predetermined value.

17. The start system of claim 16, wherein the offset current selector further comprises a low oil temperature detector that produces a low oil temperature signal that has a level to represent engine oil temperature less than the predetermined value.

18. The start system of claim 17, wherein the offset current selector further comprises a low engine speed detector that produces a low engine speed detector signal that has a level to represent engine rotational speed less than the predetermined value.

19. The start system of claim 18, wherein the low oil temperature signal has a logic level "1" to represent engine oil temperature less than the predetermined value, the low engine speed detector signal has a logic level "1" to represent engine rotational speed less than the predetermined value, and the offset current selector further comprises an AND gate with inputs coupled to the low oil temperature signal and the low engine speed detector signal to produce an AND gate output signal that has a logic "1" level when both the engine oil temperature and the engine rotational speeds are less than their respective predetermined values.

20. The start system of claim 19, wherein the offset current selector further comprises a relay that switches its output between a non-compensating current level and a compensating current level and the AND gate activates the relay with the AND gate output signal when it has a logic "1" level.

21. The start system of claim 16, wherein the predetermined value of oil temperature is within a range of approximately 0 to −20 degrees C.

22. The start system of claim 21, wherein the predetermined value of oil temperature is approximately 0 degrees C.

23. The start system of claim 16, wherein the predetermined value of engine rotational speed is within a range of approximately 5 to 20 percent of maximum engine rotational speed.

24. The start system of claim 23, wherein the predetermined value of engine rotational speed is approximately 10 percent of maximum engine rotational speed.

25. A gas turbine engine with an electric starter and a start system to deliver starting current to the starter by way of a power starter controller according to a schedule selected according to measured rotational speed and oil temperature of the gas turbine engine, comprising:
 a baseline starting current signal level source that produces a baseline starting current level signal that represents a baseline starting current needed to start the engine;
 an engine oil temperature sensor that produces an oil temperature signal representing oil temperature for the gas turbine engine;
 an engine rotational speed sensor that produces an engine rotational speed signal representing rotational speed of the engine;
 an offset current selector that produces an offset current signal level that represents an offset current needed to add to the baseline starting current to start the gas turbine engine based upon the engine oil temperature signal and the engine rotational speed signal;
 a summer that combines the offset current selector output with the baseline current starting signal to produce a compensated current starting command signal that shifts in current level according to engine oil temperature and engine rotational speed conditions;
 an analogue-to-digital (A/D) converter that converts the compensated current starting command signal to a digital compensated current starting command signal; and
 a pulse width modulator (PWM) that converts the digital compensated current starting command signal to a PWM starting current control signal that controls the power starter controller for the gas turbine engine starter.

26. The gas turbine engine of claim 25, wherein the offset current signal level varies between a non-compensating level and a compensating level.

27. The gas turbine engine of claim 26, wherein the offset current signal level reaches the compensating level when the oil temperature signal is less than a predetermined value and the engine rotational speed signal is less than a predetermined value.

28. The gas turbine engine of claim 27, wherein the offset current selector further comprises a low oil temperature detector that produces a low oil temperature signal that has a level to represent engine oil temperature less than the predetermined value.

29. The gas turbine engine of claim 28, wherein the offset current selector further comprises a low engine speed detector that produces a low engine speed detector signal that has a level to represent engine rotational speed less than the predetermined value.

30. The gas turbine engine of claim 29, wherein the low oil temperature signal has a logic level "1" to represent engine oil temperature less than the predetermined value, the low engine speed detector signal has a logic level "1" to represent engine rotational speed less than the predetermined value, and the offset current selector further comprises an AND gate with inputs coupled to the low oil temperature signal and the low engine speed detector signal to produce an AND gate output signal that has a logic "1" level when both the engine oil temperature and the engine rotational speeds are less than their respective predetermined values.

31. The gas turbine engine of claim 30, wherein the offset current selector further comprises a relay that switches its output between a non-compensating current level and a compensating current level and the AND gate activates the relay with the AND gate output signal when it has a logic "1" level.

32. The gas turbine engine of claim 27, wherein the predetermined value of oil temperature is within a range of approximately 0 to −20 degrees C.

33. The gas turbine engine of claim 32, wherein the predetermined value of oil temperature is approximately 0 degrees C.

34. The gas turbine engine of claim 27, wherein the predetermined value of engine rotational speed is within a range of approximately 5 to 20 percent of maximum engine rotational speed.

35. The gas turbine engine of claim 34, wherein the predetermined value of engine rotational speed is approximately 10 percent of maximum engine rotational speed.

\* \* \* \* \*